United States Patent [19]

Bron

[11] 4,279,267
[45] Jul. 21, 1981

[54] FLUID FLOW PROPORTIONING DEVICE

[76] Inventor: Dan Bron, 36 Palmach St., Haifa, Israel

[21] Appl. No.: 88,517

[22] Filed: Oct. 26, 1979

[30] Foreign Application Priority Data

Nov. 12, 1978 [IL] Israel .................................. 55925

[51] Int. Cl.³ .......................................... G05D 11/03
[52] U.S. Cl. .................................... 137/100; 137/99; 137/101
[58] Field of Search .................. 137/98, 99, 100, 101, 137/499

[56] References Cited

U.S. PATENT DOCUMENTS

| Re. 21,892 | 9/1941 | Hogg | 137/100 X |
| 2,760,510 | 8/1956 | Trethewey | 137/99 |
| 3,116,749 | 1/1964 | Waugh | 137/99 |

FOREIGN PATENT DOCUMENTS 395812 8/1973 U.S.S.R. .................................... 137/98

*Primary Examiner*—Robert G. Nilson
*Attorney, Agent, or Firm*—Lane, Aitken, Ziems, Kice & Kananen

[57] ABSTRACT

There is provided a proportioning device for connection to a main line carrying a pressurized fluid, for the purpose of introducing into or drawing from the main line a fluid at a rate standing in a substantially constant proportion to the flow rate of the main line. The device comprises a housing, at least one opening of which is connected to the main line and another opening of which is connected to the proportioning branch line. The device comprises a valve arranged in the housing and capable of closing the passage of the fluid into and from the proportioning branch line. The valve is mechanically linked to two drag bodies, the first one of which is located in the flow path of the main line, the second one in the flow path leading to the proportioning branch line, to such effect that the drag force acting on the first drag body tends to open the valve and thus to increase the flow through the proportioning branch, while the drag force acting on the second drag body tends to close the valve and thus to reduce the flow through the proportioning branch.

4 Claims, 6 Drawing Figures

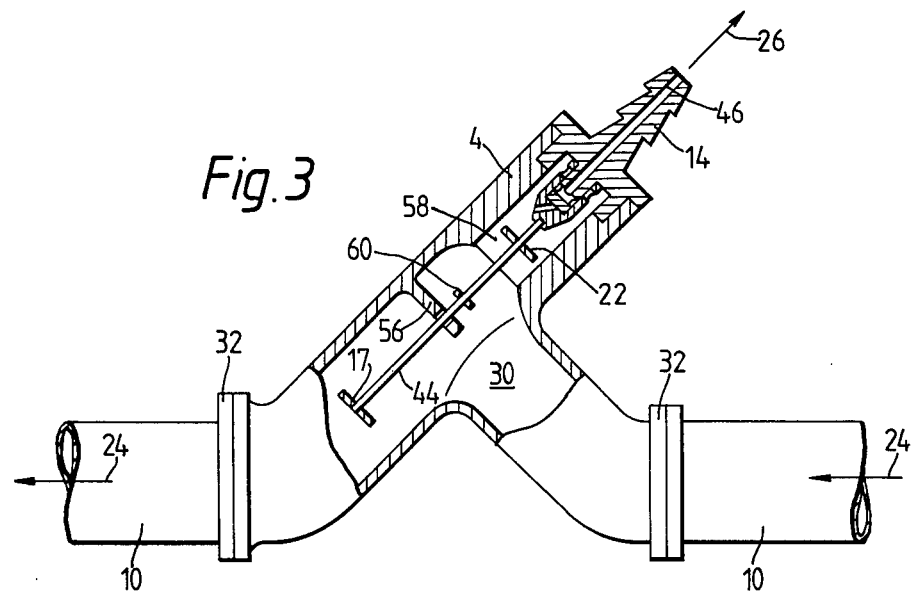
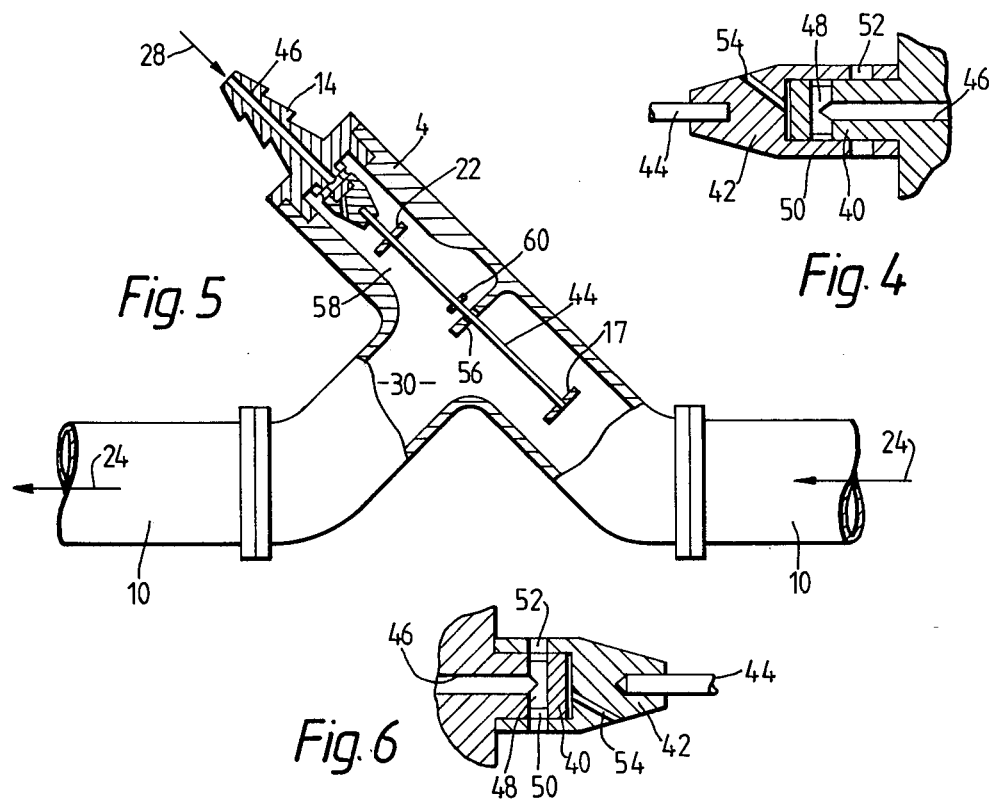

FLUID FLOW PROPORTIONING DEVICE

The present invention relates to a proportioning device for connection to a main line carrying a pressurized fluid, for the purpose of introducing into, or drawing from, such main lines a fluid at a rate standing in a substantially constant proportion to the instantaneous output rate of such a line.

The use of proportioning or metering devices which permit a main-flow-proportional introduction into, or drawing from, pressurized main lines of a fluid, is very common and one distinguishes two distinct types of such systems: (a) open-loop systems, used with main lines having a known, constant flow rate, in which the metered flow is calculated and calibrated according to the required proportion; (b) closed-loop systems in which the possibly non-constant main-line flow is continuously sensed, the metered flow being continuously and automatically adjusted to maintain the desired proportion. While open-loop systems are relatively simple, closed-loop systems are sophisticated and complex, and most expensive.

It is one of the ojects of the present invention to provide a closed-loop control system which is simple, inexpensive and reliable and which can also be combined with an open-loop proportioning system. This object the invention achieves by providing proportioning device for connection to a main line carrying a pressurized fluid, for the purpose of introducing into or drawing from said main line a fluid at a rate standing in a substantially constant proportion to the output rate of said main line, said device comprising a housing, at least one opening of which is connected to said main line and another opening of which is connected to the proportioning branch line, further comprising a valve arranged in said housing and capable of closing the passage of said fluid into and from said proportioning branch line, which valve is mechanically linked to two drag bodies, the first one of which is located in the flow path of the main line, the second one, in the flow path leading to the proportioning branch line, to such effect that the drag force acting on said first drag body tends to open said valve and thus to increase the flow through said proportioning branch, while the drag force acting on said second drag body tends to close said valve and, thus, to reduce the flow through said proportioning branch.

While the invention will now be described in connection with certain preferred embodiments with reference to the following illustrative figures so that it may be more fully understood, it is stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the devices and their elements in more detail than is necessary for a fundamental understanding of the invention, the description taken with the drawings making apparent to those skilled in the art how the several forms of the invention may be embodied in practice.

In the drawings:

FIG. 3 is a diagrammatic, partly cross-sectional view of another embodiment of the proportioning device, arranged for drawing a proportional flow from the main line;

FIG. 4 is an enlarged cross-sectional view of the valve used in the device of FIG. 3;

FIG. 5 is a diagrammatic, partly cross-sectional view of the embodiment of FIG. 3, arranged for introducing a proportional flow into the main line, and FIG. 6 is an enlarged, cross-sectional view of the valve used in the device of FIG. 5.

Figure 1:
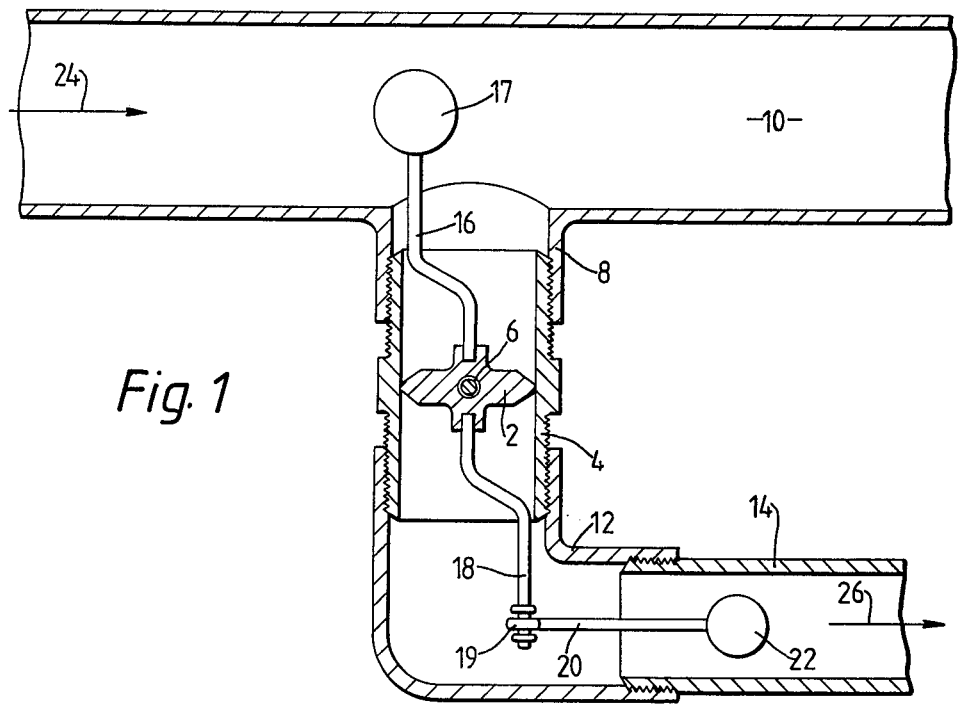
FIG. 1 is a diagrammatic, cross-sectional view of an embodiment of the proportioning device according to the invention, arranged for drawing a proportional flow from the main line.

There is shown in FIG. 1 a valve 2 mounted in a tubular housing 4 and rotatable about an axis 6. In the position shown, the size of the valve is such as to completely obturate the free cross section of the housing 4. The valve 2 in this embodiment is a butterfly valve. However, other valve types, too, may be used, e.g., cylindrical or spherical valves. One side of the housing 4 is tightly screwed into a socket 8 opening into the main line 10, the other side is tightly screwed into an elbow fitting 12, into the other end of which is screwed the proportioning branch 14. Rigidly connected to one side of the valve 2 is a rod 16 which reaches into the main line 10 and carries at its end a drag body 17, in the embodiment shown, a sphere. A similar rod 18 is attached to the other side of the valve 2 and reaches into the elbow fitting 12. To the end of this rod 18 there is attached, by means of a swivel joint 19, which permits it to swivel about the rod 18 in a plane perpendicular to the end of the rod 18, for a purpose to be explained below, a rod 20, carrying at its end another drag body 22, equally spherical. In the mounted state of the device, as shown in FIG. 1, the drag body 17 is located in, and affected by, the flow in the main line 10, and the drag body 22 is located in, and affected by, the flow in the proportioning branch 14.

In operation, the device shown in FIG. 1 functions as follows:

The flow in the main line 10 is from left to right, as indicated by the arrow 24, and, impinging on the drag body 17, exerts on it a force which, as a moment about the axis 6, will cause the butterfly valve 2 to turn in the clockwise sense and to open. The fluid now passes the valve 2 and, via the elbow fitting 12, enters the proportioning branch 14 in direction of the arrow 26, where it encounters the drag body 22, exerting on it a force that is equally translated into a moment about the axis 6. This moment, however, is counterclockwise, opposing the effect of the main-line flow, tends to close the valve 2. As the two drag bodies 17 and 22 are in this embodiment of the same size and the same configuration, and the drag force is therefore (within practical limits) a function of flow velocity and as, furthermore, the two moment arms are substantially of the same length, the opposing moments acting on the valve 2 will balance only when the flow velocity in the branch line 14 will equal that in the main line 10. The valve 2 will therefore open only to the degree required for the velocity of the flow impinging on the branch-line drag body 22 to equal the velocity of the flow impinging on the main-line drag body 17, at which instant the two moments will exactly counterbalance one another and the valve 2 will remain stationary.

As the respective diameters, that is cross sections of main and branch line are given and known, the ratio:

main-line flow/branch-line flow will always equal the ratio: main-line cross section/branch-line cross section, provided that, as stated above, the two drag bodies 17 and 22 are of the same size and the two moment arms are of the same length.

Should now for some reason the output flow and, thus, the flow velocity of the main line 10 increase, the drag force on the drag body 17 will increase as well, causing the valve-opening moment to increase as well. This will increase also the flow in the branch line 14, resulting in an increased drag force on the drag body 22, which will stabilize the position of the valve 2, the instant the two flow velocities are again equal, i.e., the original output proportion or proportioning ratio is again restored. With a dropping main-line output, the drag force acting on the drag body 17 will also drop, permitting the drag force on the drag body 22 to close enough to again equalize the two flow velocities.

In order that the moments acting on the valve 2 be depending only on the respective drag forces acting on the drag bodies, the valve 2 itself must be indifferent to pressures from both sides tending to alter the angular position of the valve 2. The proportioning ratio for a main line with a given diameter can be changed by varying one or more of the following parameters: (a) relative sizes of drag bodies 17 and 22: the larger the relative size of drag body 17, the smaller the proportioning ratio; (b) relative lengths of the moment arms of the drag bodies 17 and 22: the larger the moment arm of the drag body 17, the smaller the proportioning ratio; (c) cross section of the proportioning branch 14: the larger the flow cross section of the branch line 14, the greater the proportioning ratio.

The drag bodies 17 and 22 can have different shapes, e.g., cylindrical, plate-like, conical, pear-shaped, prismatic, cup-like, etc. The mechanical coupling between drag bodies and valve can also be realized in the shape of belt-, chain- and gear drives or the like.

Figure 2:
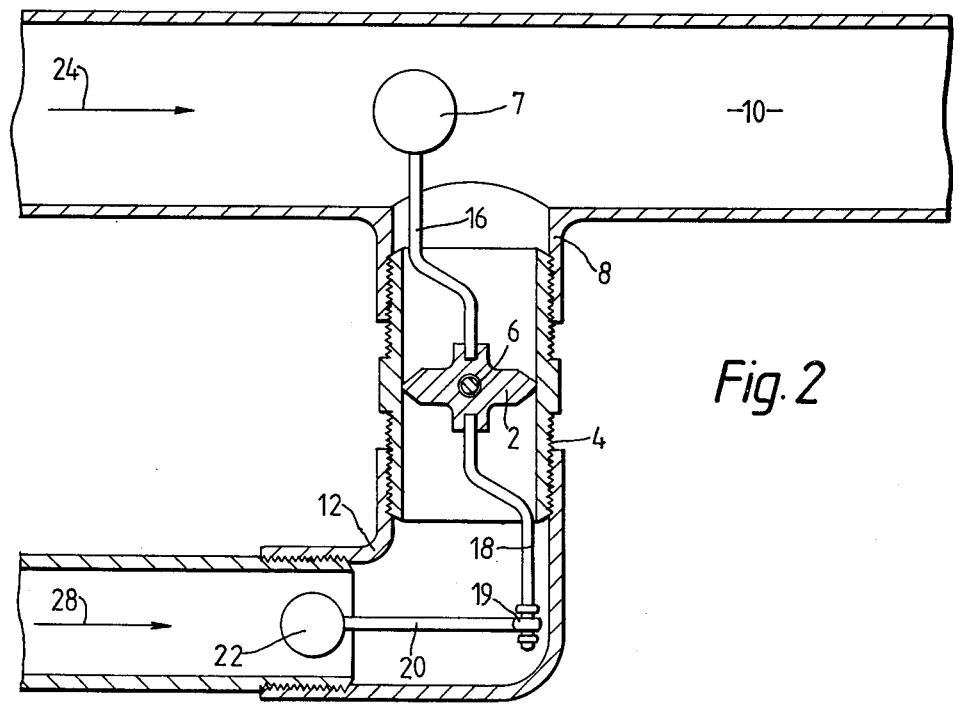
FIG. 2 is an identical view of the same embodiment, arranged for introducing a proportional flow into the main line.

FIG. 2 shows the proportioning device according to FIG. 1, but arranged for introducing into the main line 10 a proportional flow from the proportioning branch 14. Such an arrangement is used, e.g., to introduce a liquid fertilizer into an irrigation line at a certain ratio to be maintained regardless of output fluctuations, or to introduce a disinfectant such as chlorine, or the like, in which case the maintaining of a constant admixture ratio is even more important. As is seen from FIG. 2, a proportioning device according to FIG. 1, for drawing from a main line a flow of a given proportioning ratio, can be easily converted into a device for introducing into a main line a flow of a given proportioning ratio, by merely rotating the elbow fitting 12 by 180°. Here the purpose of the swivel joint 19 becomes clear: When the elbow fitting 12 is being rotated by 180°, the joint 19 permits the rod 20 with its drag body 22 to participate in the rotation, finally assuming the position shown in FIG. 2. The functioning of this arrangement of the device is analogous to the explanation associated with FIG. 1, except that the proportioning flow now enters the elbow fitting in direction of arrow 28, instead of having it in direction of arrow 26, as in FIG. 1.

The embodiments shown in FIGS. 3 to 6 can also be used with liquids, but are particularly suitable for gases because while the two drag bodies 17 and 22 are located in different spaces, these spaces communicate via the space 30 and are, therefore, at equal pressure, as opposed to the embodiment of FIGS. 1 and 2, in which the drag body 22 is located on the other side of the valve 2, that is, in the different pressure conditions of the proportioning branch 14, although this would make no difference for liquids, which are incompressible. FIG. 3 shows an embodiment of the device according to the invention, particularly suitable for gaseous media and arranged for drawing a proportional flow from the main line. Seen is the housing 4 which is inserted in the main line 10 and connected to the latter by, e.g., flanges 32. Also seen is the proportioning branch connector 14, shaped for use with a elastic tube, although other means of connection are equally possible. The valve is of the sliding type and is seen to better advantage in the enlarged cross section of FIG. 4. The valve, shown in FIG. 4 in the closed state, consists of a stationary member 40 preferably, but not necessarily integral with the branch-line connector 14, and a sliding member 42 to which there is connected an actuating rod 44. The stationary member 40 is provided with a central, axial bore 46 leading on one side to the tip of the connector 14 and, on the other, into a transverse bore 48 passing through the stationary member 40, substantially along a diameter thereof. A circumferential groove 50 is turned to some depth at the points where the bore 48 penetrates the surface of the stationary member 40, the width of which groove 50 is approximately equal to the diameter of the bore 48. The sliding member 42 has a sleeve-like portion which slidingly fits the stationary member 40 and is provided with at least one hole 52 of a diameter approximately equal to the diameter of the bore 48 and located at such a point that when the sliding member 42 is slid onto the stationary member 40 as far as it will go, the hole or holes 52 will not communicate with the groove 50. The other portion of the sliding member 42 is substantially solid, except for a bore into which is press-fitted an actuating rod 44, and a small, slanting bore 54 leading from the outside to the bottom of the bore accommodating the stationary valve member 40. The bore 54 is a venting bore, preventing the appearance of axial biasing forces due to possible leaks in the valve. The actuating rod 44 is guided in a rib-like projection 56 integral with, or attached to, the housing 4, and carries the drag body 22 in the narrower proportioning space 58 and, at its free end, the drag body 17. An annular stop member 60 limits the axial movement of the actuating rod 44.

In operation, the device shown in FIG. 3 functions as follows:

The fluid, flowing in direction of the arrows 24, enters the mixing space 30 and, assuming the valve at this stage to be in the closed position as shown, continues to flow towards the left, when it impinges on the drag body 17, causing a pulling force to be exerted on the actuating rod 44. This pulling force moves the sliding member 42 of the valve from the position shown in FIG. 4 where there is no communication between the bores 52 and 48, to a position where such a communication is being established, at which instant fluid from the mixing space can enter the bores 52, pass into the annular groove 50 and from there, through the bores 48 and 46 into the proportioning branch 14, in direction of the arrow 26. The fluid in the proportioning space 58 having started to move, a drag force is now being exerted on the drag body 22, which, transferred to the actuating rod 44, tends to close the valve. A state of equilibrium is attained when the valve-opening forces acting on the drag body 17, and the valve-closing forces acting on the drag body 22, become equal. As the drag bodies 17 and 22 are of equal size and configuration, such a state of equilibrium will obtain when the velocities around the drag bodies will be equal. At this instant, the proportioning ratio: main-line flow/branch-line flow will be equal to the ratio: main-line cross section/proportioning-space cross section.

FIG. 5 shows the embodiment presented in detail in FIG. 3, but as arranged for introducing a proportional flow into the main line 10, in direction of the arrow 28. The structure of this embodiment is analogous to that shown in FIG. 3, the main difference being the relative location of the bores 52 and 48 in the sliding member 42 and the stationary member 40 of the valve, respectively. Whereas in the extreme branch-line-side position of the valve of the embodiment shown in FIGS. 3 and 4, the holes 52 and 48 will not communicate, the same extreme valve position in FIGS. 5 and 6 shows these holes to be fully communicating. In both arrangements, the main-line flow tends to open the valve and the branch-line flow, to close it.

It is clear that the valve can assume other forms as well, provided that care is taken to prevent the appearance of axial biasing forces, which would interfere with the balancing of the two opposed drag forces. While in the embodiments of FIGS. 3 and 5 the three moving elements: drag body 17, drag body 22 and sliding member 42 are rigidly linked by the actuating rod 44, other means of mechanical coupling could be used to alter their relative strokes and speeds, with a view to increasing the sensitivity of the device. It is also obvious that, as in the embodiment shown in FIGS. 1 and 2, the drag bodies can assume various shapes other than the disk shape shown.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Proportioning device for connection to a main line carrying a pressurized fluid, for the purpose of introducing into or drawing from said main line a fluid at a rate standing in a substantially constant proportion to the flow rate of said main line, said device comprising a housing, at least one opening of which is connected to said main line and another opening of which is connected to the proportioning branch line, further comprising a valve arranged in said housing and capable of closing the passage of said fluid into and from said proportioning branch line, which valve is mechanically linked to two drag bodies, respectively located on two opposite sides of said valve, the first one of which drag bodies is located in the flow path of the main line, the second one in the flow path leading to the proportioning branch line, to such effect that the drag force acting on said first drag body tends to open said valve and thus to increase the flow through said proportioning branch, while the drag force acting on said second drag body tends to close said valve and thus to reduce the flow through said proportioning branch.

2. The proportioning device as claimed in claim 1, wherein said valve is a rotary valve.

3. The proportioning device as claimed in claim 2, wherein said rotary valve is a butterfly valve.

4. The proportioning device as claimed in claim 1, wherein said second drag body is articulated to the mechanical linkage of said valve to enable said second drag body and the proportioning branch to be swung into a diametrically opposite position.

* * * * *